(12) United States Patent
Peled

(10) Patent No.: US 11,460,816 B2
(45) Date of Patent: Oct. 4, 2022

(54) METHOD FOR MONITORING AND CONTROLLING AN INDUSTRIAL PROCESS WHICH CHANGE CONDITION OVER TIME AND A COMMUNICATION GATEWAY

(71) Applicant: AMI GLOBAL, Las Vegas, NV (US)

(72) Inventor: Ori Peled, Las Vegas, NV (US)

(73) Assignee: AMI GLOBAL, Las Vegas, NV (US)

( * ) Notice: Subject to any disclaimer, the term of this patent is extended or adjusted under 35 U.S.C. 154(b) by 288 days.

(21) Appl. No.: 16/779,497

(22) Filed: Jan. 31, 2020

(65) Prior Publication Data

US 2020/0249638 A1 Aug. 6, 2020

(30) Foreign Application Priority Data

Feb. 1, 2019 (DK) .......................... PA 2019 00152

(51) Int. Cl.
*G05B 13/02* (2006.01)
*H04W 4/80* (2018.01)
(Continued)

(52) U.S. Cl.
CPC ......... *G05B 13/0255* (2013.01); *G06N 5/022* (2013.01); *G07C 3/08* (2013.01);
(Continued)

(58) Field of Classification Search
CPC ............ G05B 13/0255; G05B 2219/15; G05B 2219/15027; G05B 2219/15029; G05B 2219/15061; G05B 2219/15062; G05B 19/4185; G06N 5/022; G07C 3/08; H04W 4/80; H04W 4/38; H04W 84/18; H04L 67/28; H04L 67/2842; H04L 67/125; H04L 67/1097; H04L 67/12
See application file for complete search history.

(56) References Cited

U.S. PATENT DOCUMENTS 6,424,121 B1 7/2002 Khouri et al.
7,672,695 B1 * 3/2010 Rainnie ................ H04B 7/2603
455/574

(Continued)

FOREIGN PATENT DOCUMENTS

CN 206208961 U 5/2017
EP 1 635 154 A2 3/2006
(Continued)

OTHER PUBLICATIONS

Danish Patent Application No. PA 2019 00152, Search Report completed Jul. 25, 2019—4 pages.
(Continued)

*Primary Examiner* — Santosh R Poudel
(74) *Attorney, Agent, or Firm* — Lathrop GPM LLP

(57) ABSTRACT

A method for monitoring and controlling an industrial process which changes condition over time includes collecting sensor data from a sensor affected by the industrial process and transmitting it to a gateway for processing, transmitting processed sensor data using a cellular device from the gateway to a remote data storage for further processing, sending instructions back to the gateway using the cellular device, producing control signals at the gateway based on the instructions, and sending the control signals to a control device connected to the industrial process.

7 Claims, 9 Drawing Sheets

(51) Int. Cl.
  *G06N 5/02* (2006.01)
  *G07C 3/08* (2006.01)
(52) U.S. Cl.
  CPC .......... *H04W 4/80* (2018.02); *G05B 2219/15* (2013.01); *G05B 2219/15027* (2013.01); *G05B 2219/15029* (2013.01); *G05B 2219/15061* (2013.01); *G05B 2219/15062* (2013.01)

(56) References Cited

U.S. PATENT DOCUMENTS

| | | | |
|---|---|---|---|
| 2006/0054335 | A1 | 3/2006 | Rapp et al. |
| 2009/0010203 | A1 | 1/2009 | Pratt, Jr. et al. |
| 2009/0086692 | A1 | 4/2009 | Chen |
| 2010/0316167 | A1 | 12/2010 | Tang et al. |
| 2011/0261738 | A1 | 10/2011 | Mukherjee |
| 2013/0211559 | A1 | 8/2013 | Lawson et al. |
| 2013/0212214 | A1 | 8/2013 | Lawson et al. |
| 2015/0053575 | A1* | 2/2015 | Bridges ............... G01N 27/302 205/787.5 |
| 2015/0327021 | A1* | 11/2015 | Ralston ............... H04W 28/06 455/456.3 |
| 2016/0170394 | A1* | 6/2016 | Allgai ............... H04L 67/12 702/188 |
| 2018/0026541 | A1 | 1/2018 | Hashimoto |
| 2018/0295535 | A1* | 10/2018 | Kavars ............... G06F 1/28 |

FOREIGN PATENT DOCUMENTS

| | | |
|---|---|---|
| EP | 3450996 A1 | 3/2019 |
| WO | WO 2019/023366 A1 | 1/2019 |

OTHER PUBLICATIONS

Danish Patent Application No. PA 2019 00311, Search Report completed Jan. 21, 2020—4 pages.
European Patent Application No. 20154508.4; Extended European Search Report and Opinion dated Jun. 8, 2020; 8 pgs.

* cited by examiner

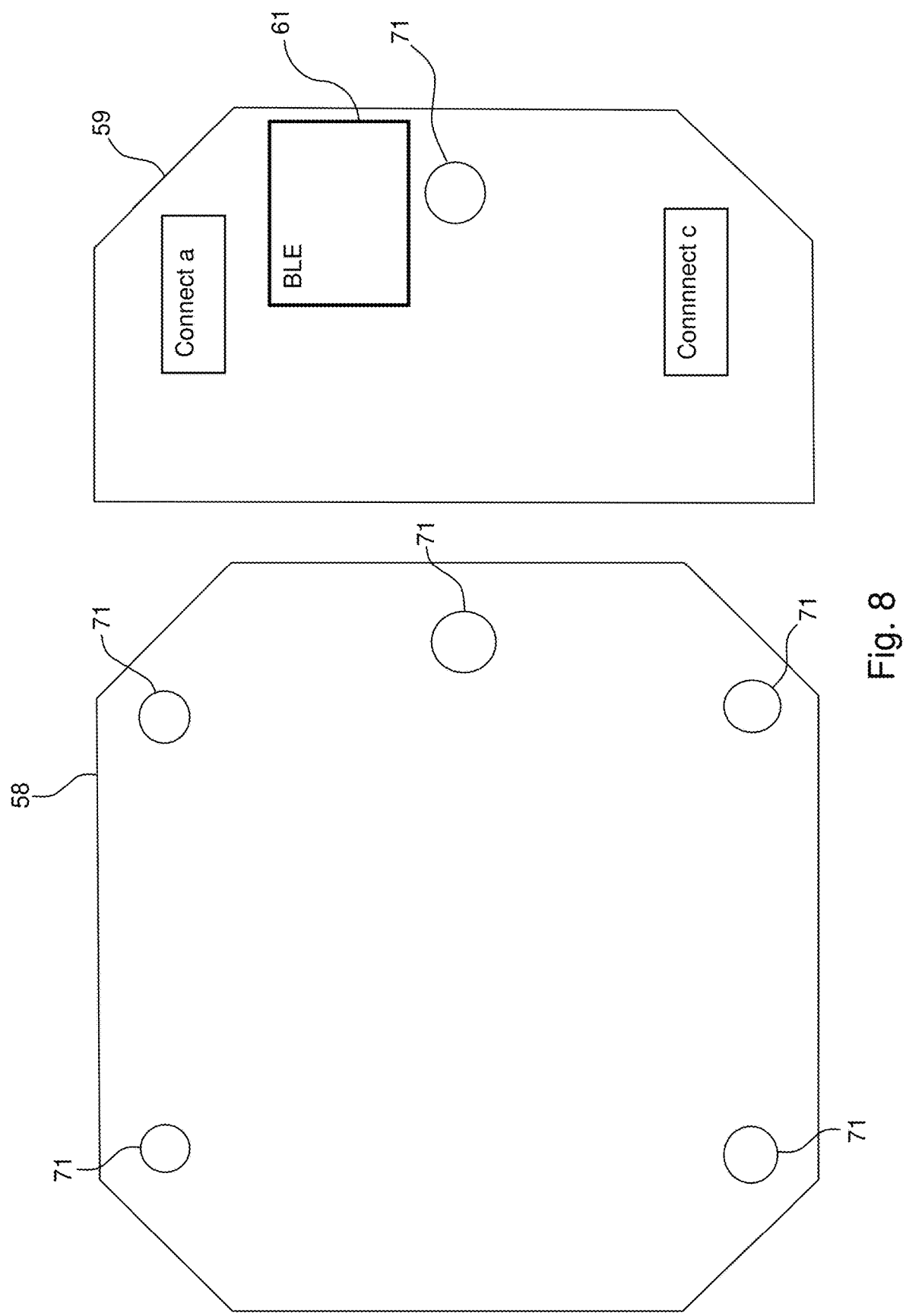

METHOD FOR MONITORING AND CONTROLLING AN INDUSTRIAL PROCESS WHICH CHANGE CONDITION OVER TIME AND A COMMUNICATION GATEWAY

CROSS-REFERENCE TO RELATED APPLICATIONS

This application claims the benefit of priority to Danish Patent Application No. PA 2019 00152 filed Feb. 1, 2019, which is incorporated herein by reference in its entirety.

SUMMARY

The invention regards a device and method which are applied to an industrial process such that possible changes in the process may be instigated. The industrial process could be any kind of process, which has a duration, and which may change during its duration. One such process could be the pumping of fluid. One or more sensors such as an accelerometer and a thermoelectric element may be attached to a pumping device, and data concerning the vibration level is here of interest as well as temperature. Measured data from various such sensors are recorded, then transmitted to a centralized data store, then analysed and finally knowledge is now available about key elements of the process. Hereafter a control signal may be advanced back to an input side of a control device which is connected to devices involved in the process in order to change a state within the process. Alternatively, a service employee is called upon to look into possible abnormalities relating to the process in question.

PRIOR ART

It is known that measuring data, such as temperature or vibration level is recorded and transmitted to a data repository remote from the process through a so named gateway. At the remote data repository, the data may be analysed in order to monitor an industrial process.

The known devices do not have both wirelessly accessible sensor elements and intermediate data storage as well as transmission capability to a remote data repository, such that large data set may be accumulated at the repository for later analysis.

It is also desirable to allow communication back to the gateway, in order that control signals may be forwarded to the process in response to possible changes registered by analysing the measured data.

It is further desired that a sensor signal from each one of a multitude of sensors is routed to the gateway by autonomically working sensor and transmission elements which elements are also easy to move from one place to another.

It is further desired that the gateway gains data regarding its current position and a precise time stamp when required.

It is further desired that the communication with the gateway is allowed from near-by devices in an easy manner.

It is desired, that the gateway may communicate control signals to external devices at a well-recognized industrial standard.

It is further desired that the gateway records sensory data at its own location, such that any industrial process in its vicinity may be monitored.

It is also desired that the gateway may work and function at some level even when an external power supply is missing.

It is further desired that the gateway is enclosed in a hardy and secure enclosure.

It is further desired that exchangeable parts may be exchanged without compromising the security of the enclosure.

Thus, there is a need for a method and an apparatus which enables higher date capacity, and which ensures that at least some of the desired properties, which are not readily available in the prior art, are present.

SUMMARY OF THE INVENTION

The object of the present invention can be achieved by a method as defined in claim 1.

A method for monitoring an industrial process which change condition over time is thus defined according to the invention in which the following steps are undertaken:
- add at least one remote sensor to an element which is part of, or affected by the industrial process;
- collect sensor data and transmit the collected sensor data wirelessly or by wire to an intermediate data storage and data processing unit hereinafter named gateway;
- transmit processed data from the gateway to a remote data storage by way of a cellular device and,
- access the remote data storage from a location and process the transmitted data further to gain knowledge of at least one condition of the industrial process, and
- that communication signals are targeted at the gateway and received via the cellular device therein either from the remote data storage or from any internet location and that,
- the communication signals are instrumental in producing an output signal from the gateway to a control device, which control device as a result of this signal serves a condition changing signal at the industrial process.

With the method it is thus possible to add a series of sensors which each transmits data to the gateway, where the received data may be processed and/or stored and then at a convenient time via the cellular device may be transferred to a remote data storage. This remote storage may then be accessed via an internet gate, as it is equipped with an internet address and sufficient communication bandwidth to allow further manipulations and calculations. The remote data storage may also comprise high capacity calculation facilities to allow costumers which access large amounts of date to perform advanced analysis in order to gain insight into the workings of the industrial process. In case the industrial process comprises a motor driving a pump in order to keep a fluid in motion or pressurized, the condition changing signal could be a signal to regulate the rpm number of the pump or switch the pump off entirely. Otherwise the condition changing signal could be any control signal, which is served at a unit in order to change a setting applied by the unit in the industrial process. The industrial process is here used about any device which may serve an output of sorts to a substance. A pump with a pump wheel, where the wheel imparts a change of impulse to a fluid is such a process, and here the output in terms of rotation number of the wheel may be controlled by serving a control signal at a control device, which guides the engine driving the pump.

According to an embodiment of the method, the collected data at the at least one sensor are transmitted wirelessly to the gateway via a battery operated short-range 900 MHz RF two-way communications radio. There is a well-established industrial standard for communication with this kind of radio devices, and as it is shortrange, the transmissions from any other such devices located further away, are not likely to interfere, as these radio devices need to be at close range in order to generate disturbing noise signals.

According to yet another embodiment, the method also comprises the collection of GPS signals in order to gain knowledge of the present coordinates of the gateway and a precise time stamp, such that data relating to a multitude of measure points that are transferred to the remote data storage location from a multitude of gateways may be compared with precise knowledge of location and timing of individual measurements. Hereby geographically dispersed industrial processes such as waterflow in cannels or pipes may be analysed and predictions may be made regarding risk of malfunction in such systems in near future. Further to this embodiment, the method comprises the wireless transmission and reception at the gateway of Bluetooth formatted information in order that the gateway may be accessed from a nearby location with a Bluetooth enabled device. Hereby it is preferred that the Bluetooth transmission and the reception of the GPS signals mutually excludes each other, such that the GPS signals are not received whenever the Bluetooth transmission is active. Hereby it becomes possible to add the GPS device and the Bluetooth device to the same communication line in the PCB of the device. This saves real estate on the PCB and allows for reduced costs, and it also allows a smaller controller with fewer output ports which reduces costs further.

According to yet another embodiment of the method, control signals are routed from the gateway through a RS485 adaptor which is part of the gateway. This allows standardized communication to and from external control devices of the PLC type.

According to yet another embodiment, analogue signals are routed to the gateway through wire connections and digitized and also digital signals are routed to the gateway through wire connections. This facility allows the connection of a range of peripheral parts to the gateway, such as temperature sensing elements, pressure or flow sensing elements. It further allows a digital counter signal to be entered.

According to yet another embodiment sensor data comprising at least one of the following: vibration level, temperature level, battery voltage and a voltage level of an external power source connected to the gateway are also recorded by built in sensors at the gateway. In this way, the gateway may both record the present environmental parameters at its location and shall also know its own state regarding availability of power. This allows the gateway to function autonomically and automatically switch between various states depending on measured parameters. When an external power source is available, full functionality of all system may be maintained, and whenever the external power source is missing, the system may maintain reduced function at some systems, and close down others. When even the battery is close to running out, a power saving mode or deep sleep mode may be entered, where only the most basic parts are active, in order that the gateway may resume operation as soon as external power is registered.

In a further aspect of the invention, a gateway is provided which comprises a wireless short-range 900 MHz RF two-way communications radio adapted to communicate with a number of remote sensors and a wireless short-range Bluetooth two-way communications capability adapted to work as access point to the gateway from a nearby communication device and a GPS signals receiving unit and a cellular device adapted for long range, two-way communication and data transmission which cellular device is adapted to facilitate communication between the gateway and a remote data storage through a cellular communications network and wired connection means comprising power supply, digital and analogue input and digital output terminals and an exchangeable battery pack and a built-in sensor which is adapted to determine the voltage level of the power supply line and further sensors adapted to determine vibration level and temperature at the gateway.

Hereby a gateway is achieved, which may function autonomically and independently, and which may receive data regarding industrial processes at its actual location and data regarding industrial processes in its near environment, and which may be reached both from a remote location and from staff in its vicinity and which further may communicate digitally with control devises. The gateway thus is usable for a wide range of applications and may be regarded as the "swiss knife" of gateways, as it has a communication ability for almost any situation with regards to monitoring and also controlling industrial processes.

The gateway may communicate with up to 8 remote devices via the two-way 900 MHz radio, and these remote devices thus each comprise a similar radio and a sensor, such as an accelerometer and a power supply possibly a battery. Each remote sensor may then collect data such as acceleration and vibration level data, and process these as is known in the art, and regularly transmit condensed measured values for acceleration and vibration level or other sensed parameters to the gateway.

In an embodiment, the gateway comprises a moisture tight enclosure which is adapted to hold all of the components, such that the gateway may work and function at rugged environments oftentimes found in the industries.

In an embodiment, the gateway comprises a square base element with a footprint of no more than 10000 mm$^2$ and preferably no more than 8500 mm$^2$, and further the gateway comprises a cover adapted to fit the square base element along a rim thereof whereby a gasket is provided between the base element and the cover. The narrow footprint allows the gateway to fit into or onto most industrial devices and can only be achieved by stacking PCB (printed circuit board) elements above each other in planes parallel to the footprint plane. Also, this demands that the cover is adapted to fit a rim part, which follows the perimeter of the footprint, such that at least one PCB sized according to the footprint may be installed in the base element. A further PCB may be installed above or below the PCB sized according to the footprint.

In a further embodiment of the gateway, a battery compartment is provided at a backside of the cover and this battery compartment has a lid, which is detachably attached to the rim of an opening in a front side of the cover and also the battery compartment has a partition wall which is attached to the backside of the cover, whereby the partition wall has in-moulded battery connectors at one side and solder pads for leads adapted to form connections between the battery connectors and power consuming parts within the moisture tight enclosure.

In this construction the batteries may be exchanged by detaching the lid from the cover and releasing the batteries from the battery connectors and insert replacement batteries. The lid is easy to re-install and the process may be performed without compromising the tightness of the moisture tight enclosure. The lid may be fastened by screws or via click-connections, and in any case, it will be advantageous to include a flexible gasket between the lid and the cover, such that also the batteries may enjoy a moisture free environment once the lid is re-installed after battery replacement has been performed.

In a further embodiment the square base element and the cover are secured against each other by a connection screw at each corner, which screws are tube-shaped and each has a through-going hole along the centre axis thereof, and further there are mounting screws for mounting the square base element onto a mounting base at each corner of the base element, where the mounting screws are provided co-axially with the tube connection screws and may be reached through the holes in the connection screws. Here the screw holes in both base part and cover are provided at an outer side of the gasket between base part and cover part, such that gasketing the screw holes is not required. The coaxially arranged connection and mounting screws allows for optimizing the usable part of the footprint and also, the assembled gateway may be mounted onto a substrate in assembled state. And when it has been mounted, the hollow connection screws may be unscrewed while the base remains firmly seated to the substrate by the mounting screws. It is thus easy to add electrical connection leads to connections inside the gateway, such as further analogue input leads by simply detaching the cover from the base and draw leads through holes therefore in the base part and connect leads to connection terminals sitting on and connected to the PCB. The cover part may be installed afterwards by tightening the tube-shaped screws.

In an embodiment, the square base element and the cover each comprise a flexible skin element, which is attached to base element and cover respectively in an assembly process, whereby one or more narrow tether strips of the skin interconnects the base skin and cover skin at one particular exterior side such that the square base element and the cover shall remain tethered to each other when the cover is loosened from the base element by un-tightening the connection screws. These tether elements are advantageous when the cover is un-seated from the base, as the base element and the cover does not come entirely apart but stay flexibly tethered to each other. It is further to be noted, that the skins are made from a rubbery polymer material, which by being both flexible and resilient will protect the base element and the cover against impact damage. Thus, it is especially ensured, that the skins cover external corner parts of the gateway.

DESCRIPTION OF THE DRAWINGS

The invention will become more fully understood from the detailed description given herein below. The accompanying drawings are given by way of illustration only, and thus, they are not limitative of the present invention. In the accompanying drawings:

FIG. 7 shows a schematic front view of the two PCB elements in the housing and FIG. 8 is a schematic back view of the two PCB elements.

DETAILED DESCRIPTION OF THE INVENTION

Figure 1:
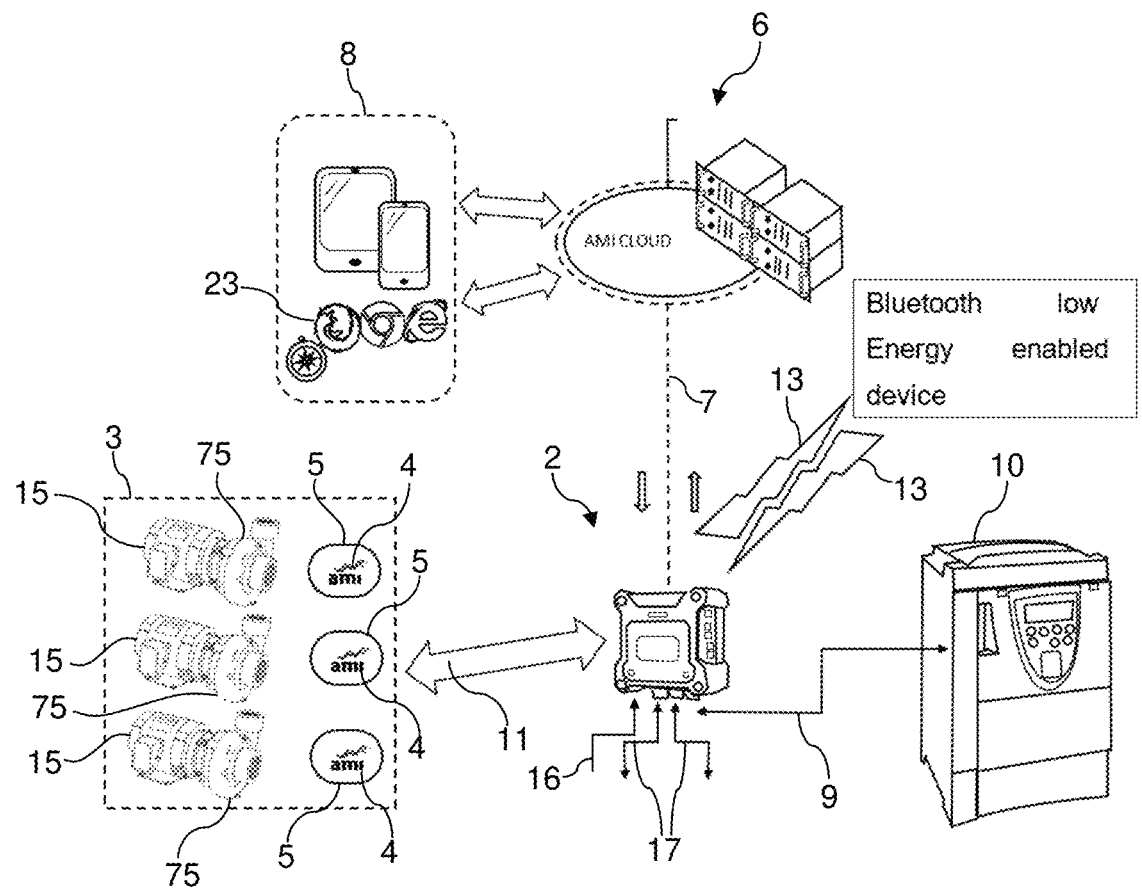
FIG. 1 shows a schematic view of a gateway 2 with the main communication canals shown.

Referring now in detail to the drawings for the purpose of illustrating preferred embodiments of the present invention, a gateway 2 of the present invention is illustrated in FIG. 1 with accompanying peripherals.

FIG. 1 is a schematic view of an intermediate data storage and data processing unit hereinafter named gateway 2 according to the invention. The gateway 2 comprises a number of communication or routing options marked by the various arrow symbols, and also comprises a certain internal data storage (not shown) and calculation capability, such that more processed data may be delivered out of the gateway 2. This saves valuable communication time and/or may delay delivery of data to a remote data storage or repository 6 according to a transmission schedule determined in advance or determined by available power.

The gateway comprises a 900 MHz RF two-way communication radio and arrow 11 indicate a number of channels for wireless communication with this radio. Remote sensors 4 with accompanying 900 MHz transceivers are provided to send sensed conditions at each their communication channel to the gateway 2. In FIG. 1 the industrial process 3 which is monitored comprise a series of motors, and in this case electrical motors 15 which may be used for driving pumps 75 at a pumping station. The sensors 4 here are vibration sensors and by this arrangement it is possible to document wear on either pump or the motor driving each pump or both. However, any other possible measurable conditions such as temperature, speed or pressures may be measured at each motor 15 or accompanying pump 75 and measured values forwarded to the gateway 2.

As seen in FIG. 1 the data which arrives at the gateway via wireless signals 11 may be transferred further to a remote data storage facility 6 via a communications network. Such a facility is also known as a cloud storage 6. The communications network used to transfer the data onto the cloud data storage 6 is in this case based in cellular communications network such as a telephone network. The cellular device 7 is itself located inside the gateway 2, but as the cellular device communicates via a network the entire entity of cellular device and network is marked 7.

At the remote data storage 6 or the cloud, the transferred data will be available for further processing by way of usual internet access using a browser 23 on a communication device. Thus, the cloud data may now be further processed, either at the cloud facility or after download to a customer device, in order to glean off further information about the industrial process 3.

Also, from the remote cloud data store 6, data streams may be targeted back towards the cellular device 7 in the gateway 2, and thus the gateway 2 may be instructed to feed control signals 9 to a control device 10. This is achieved by including a RS485 communication port in the gateway, such that the control device could be a PLC type of device which then may target the industrial process, such as the motors 15 driving the pumps 75, in order to change the process going on here. This may be individually targeted at each pump in a control circuit inside the pump or more usually by instructions to a control box or panel, possibly inside the control device 10, which then changes the power feed to each pump.

In the above example of the invention, pump drivers and pumps constitute the industrial process, but any kind of industrial process be that a chemical, a mechanical, a biological or electrical process or combinations thereof could be the target for use of the gateway.

In FIG. 1 it is further illustrated how BLE (Bluetooth low energy) communication 13 is also part of the gateway 2. This communication option is used whenever an operator at or near the gateway needs to change and/or look into the operational mode of the gateway 2. The operator puts a magnet in close proximity of the gateway 2 in order to change the stat of a reed switch 49 inside the gateway 2 (see FIG. 7), and the rising edge of the reed switch signal triggers the turn off of a GPS 62 receiver and energize a BLE transceiver 61 in the gateway 2. Now the gateway may be programmed using the BLE communication channel 13, and as long as this channel remains active, the GPS 62 is turned off. When BLE communication channel has not been active for a time, the device changes back to normal mode, and accepts the GPS coordinates and turns off the BLE communication means.

There is also a power supply line 16 and a number of further communication options, such as analogue input terminals 17 and digital input terminals 17 provided at the gateway 2. Analogue input lines comprise the following options in a preferred embodiment: 0-3V; 0-10 v and 4-20 mA input options. The digital input may comprise a high-speed counter.

A GPS 62 is included into the gateway 2, such that the exact position and an exact time signal is always available at the gateway. The time signal is useful in case precisely timed measurements are desired, and the GPS signals giving the exact location of the gateway may also come in handy in case the gateway is used on board moving vehicles such as ships, air flights, trains or other transportation equipment.

Figure 5:
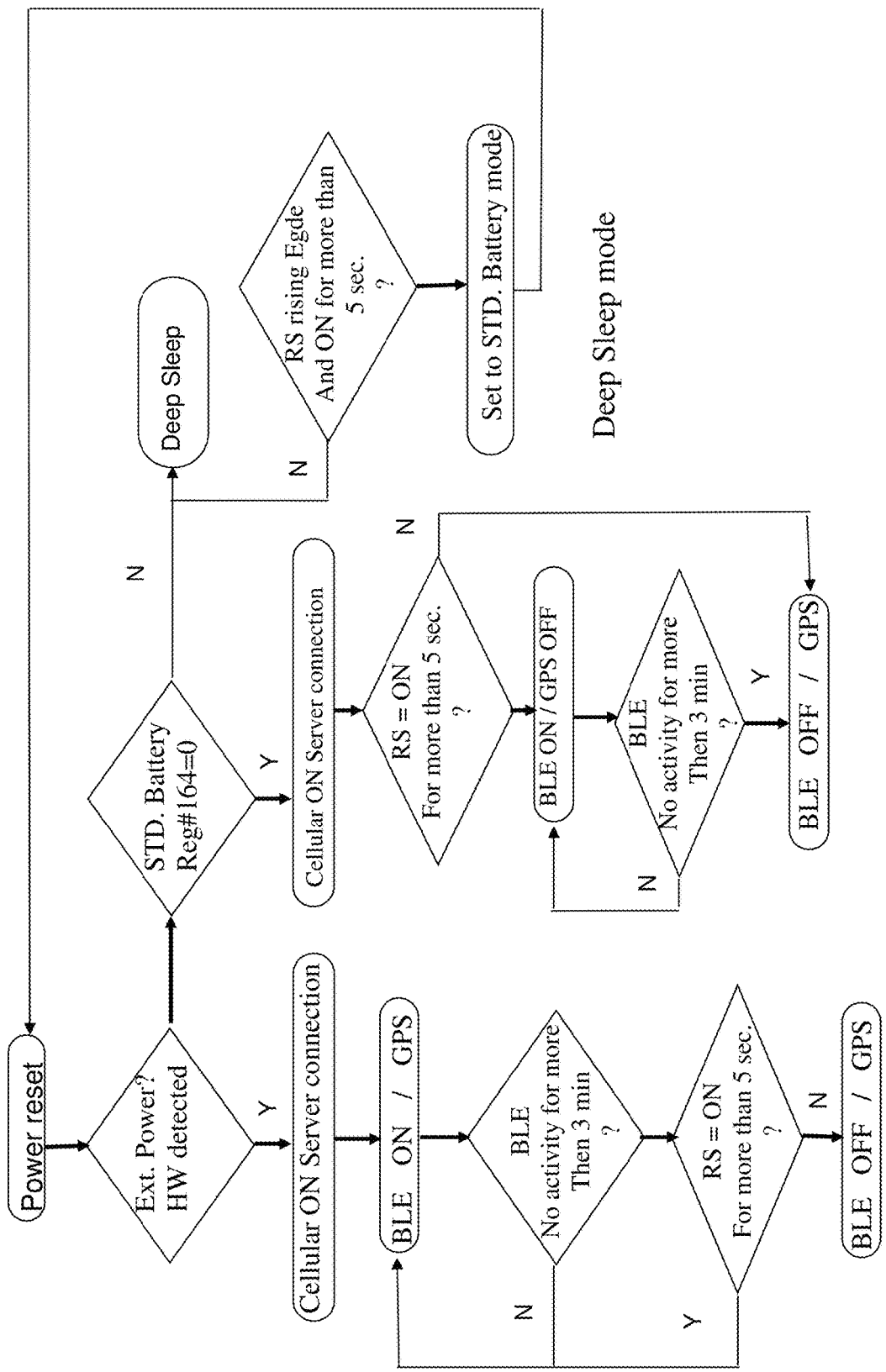
FIG. 5 is a route diagram showing the basic function of the gateway.

The BLE communication device 61 and the GPS device 62 share a communication line, so that only one of the two may be in communication with the gateway CPU/microcontroller at any given time. This is ensured by the communication and control protocol disclosed in FIG. 5. The three columns represent the working mode of the gateway 2 at three different conditions:

1) external power supply is available
2) only battery power is available
3) no external power supply is available and battery power is low.

Mode 1, External power supply mode: The first mode is instigated, whenever the various active hardware parts of the gateway are detected in step 1a, and the external power is available. Here in step 1b, the cellular device 7 is activated for connection to the remote data storage 6. The cellular device now works with full load and is continuously on, and regularly transmits data to the remote data storage, up to 20 sample/hour and 8 updates to the data storage per day. Also, in this mode, the 900 Mhz radio 11 is active and shall receive up to 80 byte messages every 10 seconds in short bursts. The RS485 adapter 12 is continually turned on for communication with an external control device 10. In following step 1c, the BLE is turned on, and the GPS is turned off. In step 1d, it is checked, if the BLE line is active, and as long as this is the case, the device remains in this mode with BLE turned on and GPS turned off by return to step 1c. In case it is detected, that the BLE has been inactive for some time, here 3 minutes, a further check is made in step 1e, namely whether the reed switch has been active for more than 5 seconds. If this is the case, BLE remains on, and GPS remains off by return to step 1c. The reed switch activity indicates that someone close to the device requires communication via the BLE channel. If the reed switch has not been identified as on for more than 5 seconds, the BLE is turned off, and GPS is switched on in final step 1f. As mentioned, this saves a communication line out of the microcontroller 67, as one and the same line is used to communicate with the BLE device as well as the GPS device. Savings up to 10% may be achieved by this.

Mode 2, only battery power is available: in mode 2 it is initially detected in a step 1a, that there is no external power available, and as a result of this, the battery state is consulted in step 2a, and if there is sufficient battery power available, the cellular device 7 is turned on in order to communicate with the remote data storage 6. However, in reduced mode, so that the cellular device is intermittently active such as up to 12 times/day and uploads data to the remote data storage 6. Also, in this mode, the 900 Mhz radio communicates less frequently with external devices, such that messages are only received once every minute and the messages contain bursts of up to 80 bytes. The RS485 adapter is muted in this mode.

In step 2c it is determined whether the read switch has been on for more than 5 seconds. In the affirmative, the BLE is activated, and the GPS is turned off in step 2d, in order that the device becomes available for communication via the BLE channel. In case the read switch has not been on for more than 5 seconds, the BLE and the GPS are both turned off in step 2f, so that the GPS does not consume power in battery mode. In step 2e, it is checked whether the BLE has been active for more than 3 minutes. If not, step 2d is repeated, otherwise BLE is turned off and GPS is turned off as well in step 2f.

Mode 3, no external power supply is available (affirmed in step 1a), and battery power is not available (affirmed in step 2a): here in step 3a deep sleep mode is entered, which is illustrated in step 3b, where only read switch signal in terms of rising edge detection remains active. If a rising edge is detected and the read switch has been detected as on for more than 5 seconds, the mode is set to standard battery mode and a power reset is instigated whereby power sources are checked. If no read switch signal is detected, the deep sleep mode remains un-changed.

The gateway itself is also home to various sensors, which may determine conditions inside the gateway 2 or outside it. Notably, an accelerometer is provided, a temperature measuring device is provided and further a measuring device such as the mentioned reed switch is included. The gateway may switch automatically between battery powered mode and power line mode according to the state of the power line 16. The further internal sensors may be used to determine conditions at the device to which the gateway is attached, such as vibration level and temperature.

Figure 2:
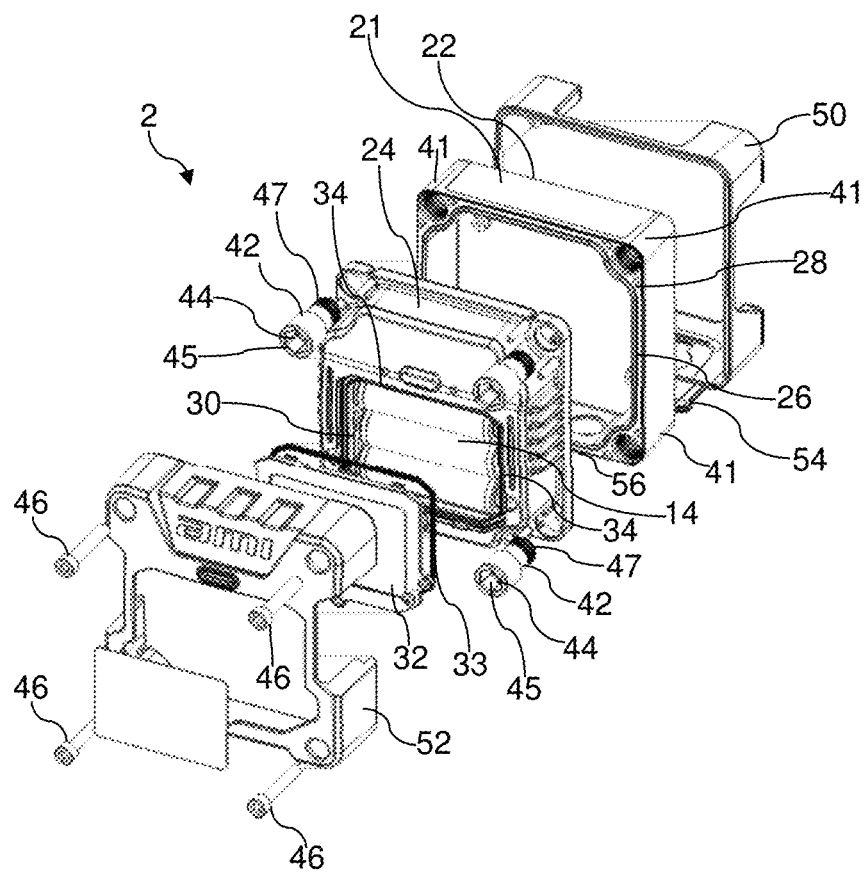
FIG. 2 shows a 3*d* representation in exploded view of a gateway 2.
Figure 3:
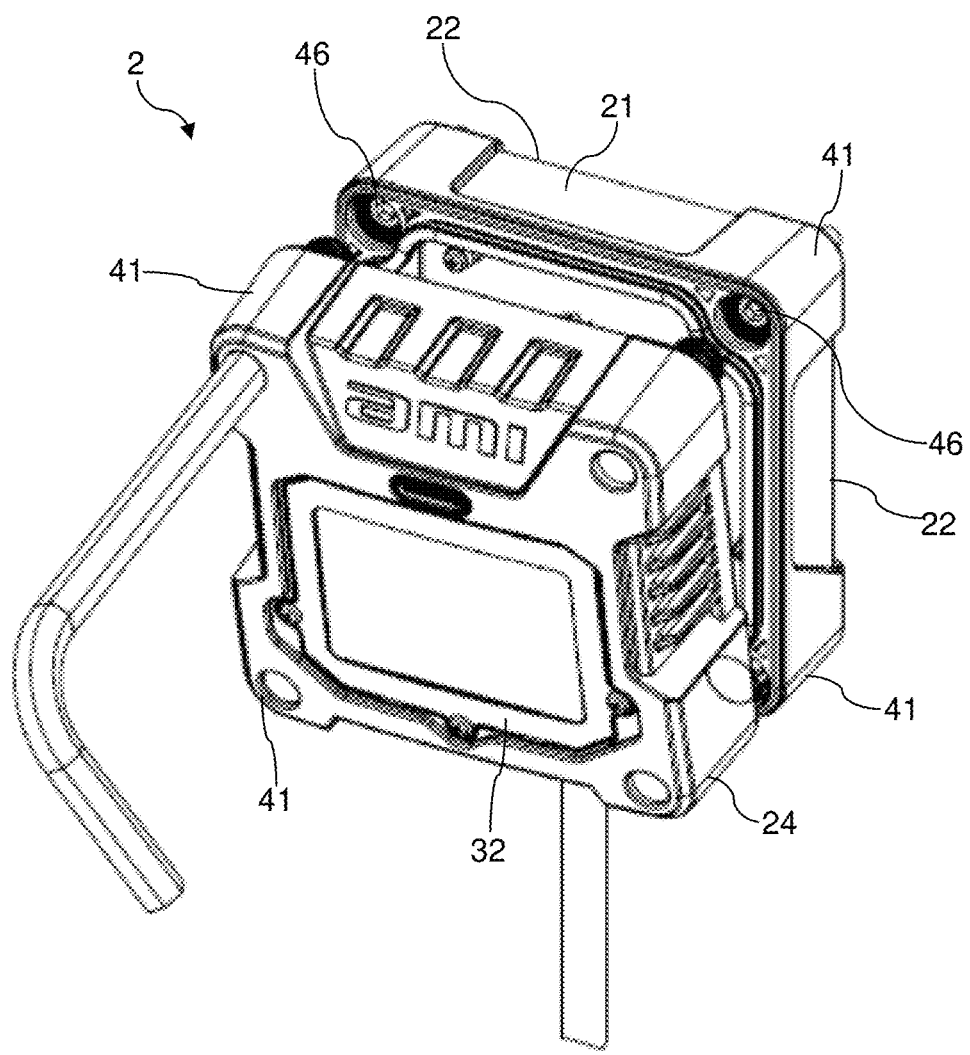
FIG. 3 shows the gateway with the cover in the process of being loosened from the base element.
Figure 4A:
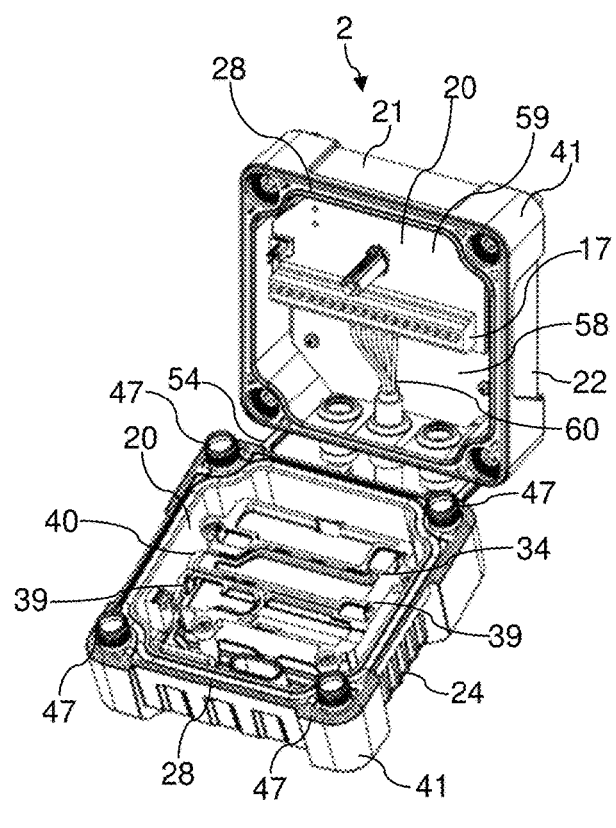
FIG. 4A shows a perspective view of an opened-up gateway 2.
Figure 4B:
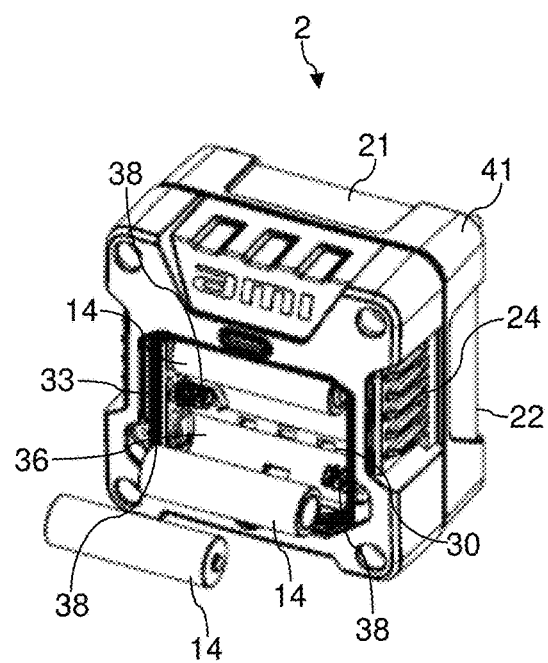
FIG. 4B is the gateway 2 with removed battery cover.
Figure 4C:
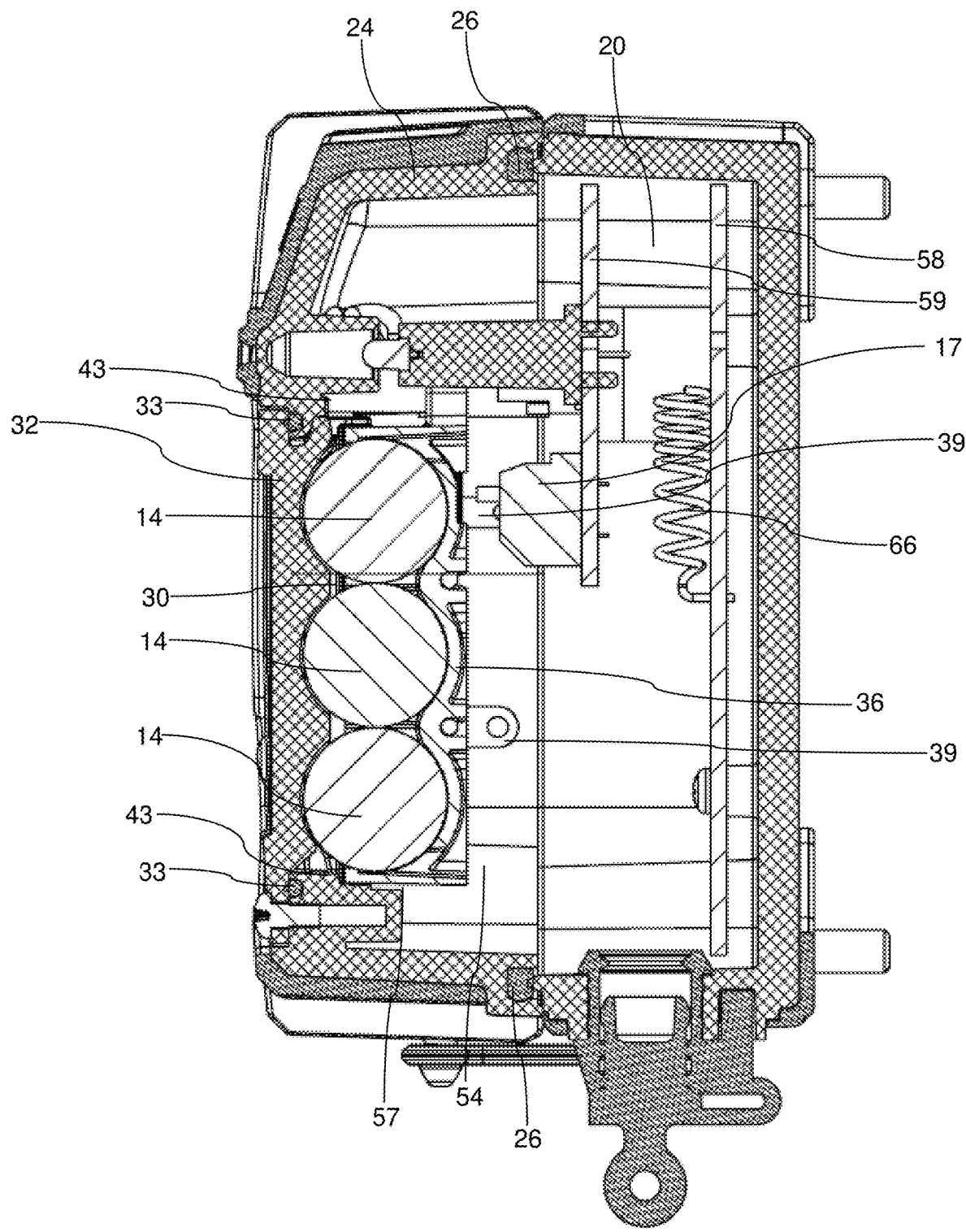
FIG. 4C is a sectional view of the gateway.

The gateway 2 comprises batteries 14, which are exchangeable in the usual way through a lid 32 to a battery compartment 30 as disclosed in FIG. 2, FIG. and FIG. 4A-FIG. 4C. Rechargeable batteries are preferred, in order to keep battery replacements at the lowest possible level. Whenever external power is available, the batteries may thus be charged.

As further seen in FIG. 4A, FIG. 4B and FIG. 4C, the battery compartment 30 is comprised of a partition wall 36, which has in-moulded battery connectors 38 at the one side and solder pads 39 for leads 40 to connect the batteries 14 to the gateway devices at an opposed side thereof. This partition wall 36 is seated from the back side towards the cover 24 with a partition wall gasket 43 and access to the battery compartment is granted through a removable lid 32, which is fastened to the frontside of the cover 24. In this way it becomes possible to change battery through the frontside of the cover 24 without compromising the sealed off and moisture tight enclosure 20 of the gateway 2. The removable lid 32 is also connected to the cover 24 via a battery lid gasket 33 to ensure vapor tightness of the battery compartment 30.

FIG. 2 shows an exploded view of the moisture tight enclosure 20 of the gateway 2. The enclosure is comprised of a square base element 21 and a cover 24, and the cover 24 and base element 21 are adapted to seal against each other along a rim 28, with a gasket 26 inserted along a sealing line. In order to ensure pressure at the entire gasket 26 along the sealing line, the cover is secured against the base element by connection screws 42. As seen in FIG. 2 the screws 42 are placed, one in each corner 41 of the square base element 21 and outside the sealing line. The connection screws 42 are tube-shaped so that each of them has a through-going hole 44 along the central axis thereof. The mounting screws 42 has, at one end thereof, internal Allen wrench connection surfaces 45 and at the opposed end there are external threads 47.

As seen in FIG. 2, the mounting screws 46 may be inserted in holes at each corner of the cover 24 and screwed into internally threaded holes in the base element 21. The holes through the connection screws 42 allows the insertion of mounting screws 46 therethrough, such that the mounting screws 46 pass through the internally threaded holes in the base element and may be screwed into a mounting base 48. The mounting screws 46 may be accessed through the through-going holes 44 of the connection screws 42 for releasing or tightening. By this construction it becomes possible to secure or release the moisture tight enclosure 20 to/from a mounting base 48 without opening the enclosure, and it becomes possible to take the cover 24 apart from the base element 21 without demounting the entire enclosure 20.

The tight build of the enclosure 20 allows the base element to have a very limited footprint 22. Preferably the footprint is not above 10.000 mm$^2$, and in the disclosed embodiment the footprint 22 is no more than 8500 mm$^2$.

Figure 6:
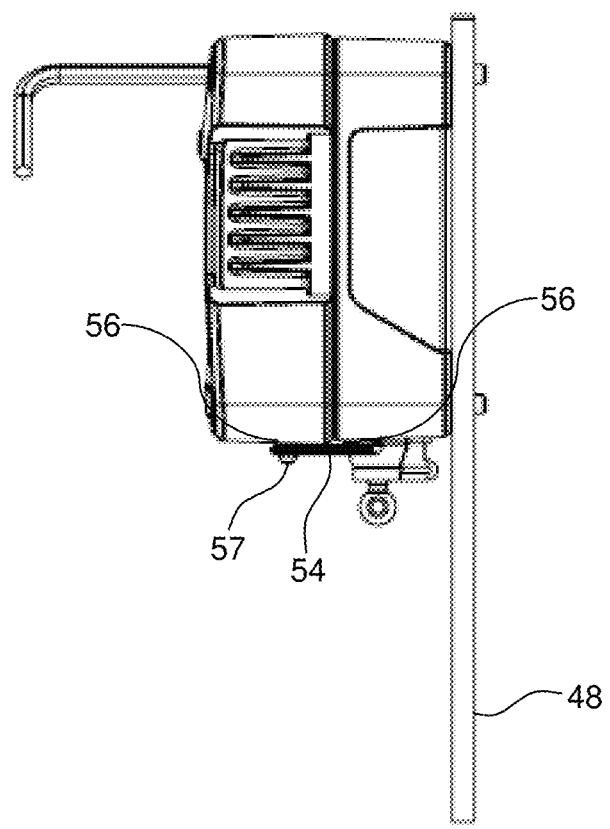
FIG. 6 is a sideview of the gateway housing mounted on a mounting base 48.

As seen in FIG. 4A the footprint of the base element is used to accommodate a base PCB 58, which is mounted into the base element 21 in parallel with a bottom wall, and when this wall is attached to the mounting base as shown in FIG. 6, the base PCB 58 shall also be parallel to the mounting base. The accelerometer (indicated in FIG. 7) is provided on the base PCB and mounted thereon in the usual way but care has been taken, that it sits next to a connection screw, which ensures that the PCB is immovably fixed to the bottom wall of the base element 21. This ensures, that vibrations transmitted through the mounting base, shall reach the accelerometer undistorted and un-attenuated.

A top PCB 59 is also provided, which sits above base PCB 58. Top PCB 59 does not fill out the entire space inside the rim 28, such that external connection leads may fan out above the base PCT in order to reach the input and output terminals 17 mounted on the top PCB 59 along a lover edge thereof. This is seen in FIG. 4A.

In FIG. 2, skins 50, 52 or sleeves which are designed to at least partially cover external surfaces of the base element 21 and cover 24 are disclosed. The two skins 50, 52 are made in flexible rubbery material, preferably a polymer composition with rubber properties, which is mouldable by injection moulding.

The base skin 50 comprises tether strips 54, which extend from one particular exterior side 56 of the base element 21 and are attachable to corresponding protrusions 57 at the exterior of the cover skin 52 and arranged at the corresponding one particular side 56 thereof. As seen in FIG. 2 and FIG. 4C the one particular exterior side 56 is the side also comprising lead entrances for the input and output leads which feeds wired signals to/from the gateway 2. This allows the cover to be unscrewed from the base element, while it is flexibly attached thereto by the tether strips 54. The connection between the tether strips and the protrusions is detachable and is made as a click-connection. The protrusion 57 has a head and a narrower neck part, and the tether strip comprises, at the end thereof, a ring-shaped element, which may be pried over the head and sit tightly around the neck part.

In an alternative to this construction, the base element and the cover may be pivotally linked directly to each other by well known means such as a hinge and hinge pin construction (not illustrated in figure).

Figure 7:
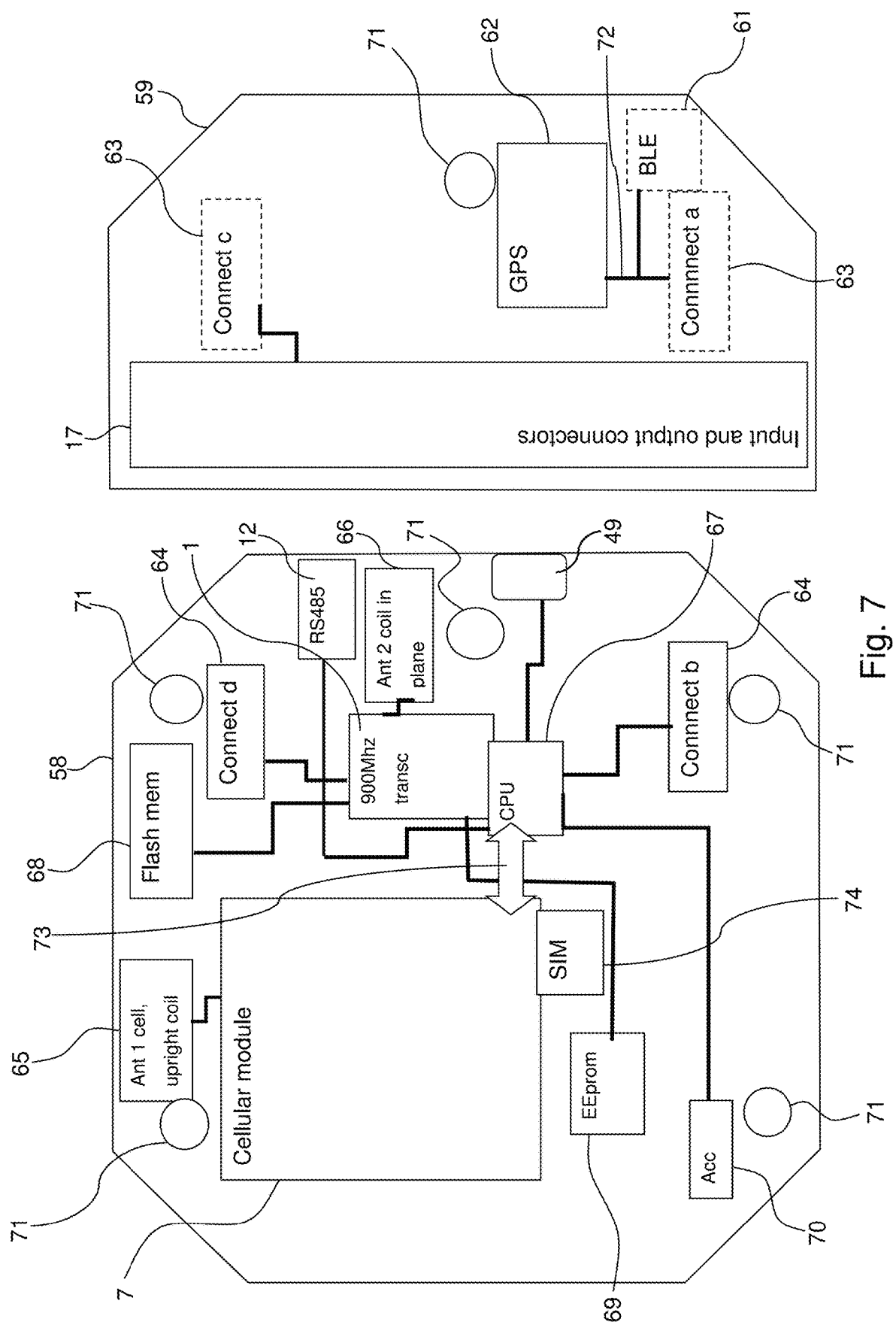

In FIG. 7 and FIG. 8 the base PCB 58 is shown next to the top PCB 59 in FIG. 7. When top PCB 59 is attached above base PCB 58, the connectors c and a labelled 63 shall connect to connectors d and b labelled 64 respectively, such that an array of pins in each connector 63, 64 shall ensure that signal and power paths are provided between the two PCBs for seamless communication. In FIG. 8 the back side of the PCB is shown, and here only a few components are present, of which only the most important are shown. The connectors c and a sit here and are represented in FIG. 7 in dashed line to indicate their position on an opposed side. The cellular module 7 may comprise a sim card 74 possibly embedded therewith. Also connected to the cellular module 7, a cellular module antenna 65 is provided. The antenna 65 is only indicated schematically in FIG. 7 but may comprise a coil with a coil axis perpendicular to the plane of the PCB 58. The coil may be an open-ended coil. As top PCB 59 does not extend over base PCB 58 at the location of cellular module antenna 65, there is room for an antenna coil at this place within the gateway enclosure. A dedicated communication line 73 comprising a multitude of leads is provided between the cellular device 7 and a CPU 67. the 900 MHz radio transceiver 1 is embedded in the CPU 67. As seen, the CPU 67 has communication lines to each of the active devices, of which the most important are disclosed in FIG. 7. A flash memory 68 and an EE prom 69 are usual necessities and provided on the PCB, however their location is not critical and may deviate from the disclosed. The RS485 module is shown with a connection line to the CPU, however it may also have one or more dedicated communication lines (not shown in the drawing) to the input and output connectors 17. An antenna 66 is disclosed schematically next to the 900 MHz transceiver 1 (also seen in FIG. 4C), and this antenna is preferably a coil antenna with a coil axis parallel to the plane of the base PCB 58. This allows the coil to sit between the two PCBs and also by this positioning it may have a coil axis, which is orthogonal to the coil axis of cellular antenna 65, which could ensure less interference between the two antennas, which may have to be active simultaneously. As seen in FIG. 4C the coil antenna 66 is open ended as is known in the art.

The reed switch 49 is disclosed close to the rim of base PCB 58, and this position ensures that the reed switch is close to an upper exterior wall of the gateway casing. Thereby it shall be sensitive to a magnetic field, which will be present whenever an employee places a magnet close to the exterior of the enclosure.

As seen the GPS 62 and the Bluetooth Low Energy (BLE) communication module 61 shares a communication line 72 through connector a 63 and connector b 64 to the CPU 67.

This is usually not possible and is only enabled by ensuring that the CPU only communicates with the GPS 62 whenever the BLE module 61 is not active. The BLE module 61 is shown in FIG. 8 in full line, as its location is at the backside of the top PCB 59. Both BLE module 61 and GPS 62 comprise antennas, but they may be provided as patch antennas on the PCB and are not disclosed in the Figures.

Power supply and power supply lines shall be supplied according to usual practice in the field, and passives comprising resistors and capacities are also used where appropriate even if not disclosed. A number of diodes are also part of the device, but are not described or shown as they are used in well-known manner, including the use of a light diode to provide an indicator light on an exterior part of the enclosure. Leads are provided on both sides of the PCB and may also be embedded in several layers in the PCB as is known in the art.

LIST OF REFERENCE NUMERALS

1—wireless short range 900 MHz RF two-way communications radio
  2—gateway
  3—industrial process
  4—remote sensor
  5—element of industrial process
  6—remote data storage
  7—cellular device
  8—location
  9—control signals
  10—control device
  11—900 MHz RF channels
  12—RS485 adaptor
  13—BLE signals
  14—exchangeable battery
  15—motors
  16—power supply line
  17—digital and analogue input and output terminals
  18—built in sensor
  19—further sensors
  20—moisture tight enclosure
  21—base element
  22—footprint
  23—internet browser
  24—cover
  26—gasket
  28—rim
  30—battery compartment
  32—lid
  33—battery lid gasket
  34—an opening
  36—partition wall
  38—battery connectors
  39—solder pads
  40—battery leads
  41—corner
  42—connection screw
  43—partition wall gasket
  44—through going hole
  45—Allen wrench connection surfaces
  46—mounting screw
  47—threads at connection screw
  48—mounting base
  49—reed switch
  50—base skin
  52—cover skin
  54—tether strips
  56—one particular exterior side
  57—protrusions
  58—base PCB
  59—top PCB
  60—external connection leads
  61—BLE transceiver
  62—GPS
  63—connectors a and c
  64—connectors b and d
  65—cellular module antenna
  66—900 MHz radio antenna
  67—CPU/microcontroller unit
  68—flash memory
  69—EEprom
  70—accelerometer
  71—through going hole for mounting screw
  72—shared communication line
  73—dedicated communication line
  74—SIM card
  75—pump

The invention claimed is:

1. A communication gateway which comprises:
  wireless short-range 900 MHz RF two-way communications radio adapted to communicate with a number of remote sensors;
  wireless short-range Bluetooth two-way communications capability adapted to work as access point to the gateway from a nearby Bluetooth enabled communication device;
  a GPS signals receiving unit;
  a cellular device adapted for long range, two-way communication and data transmission which cellular device is adapted to facilitate communication between the gateway and a remote data storage through a cellular communications network;
  wire connection terminals comprising power supply line terminal, digital and analogue input terminals and digital output terminals;
  an exchangeable battery pack and a built-in sensor which is adapted to determine the voltage level of the power supply line;
  further sensors adapted to determine vibration level and temperature at the gateway;
  characterized in that the gateway further comprises a moisture tight enclosure which is adapted to hold the mentioned components.

2. A communication gateway as claimed in claim 1, characterized in that the enclosure comprises a square base element with a footprint of no more than 10000 mm2, and that the gateway further comprises a cover adapted to fit the square base element along a rim thereof whereby a gasket is provided between the base element and the cover whereby the gasket is shaped to follow the perimeter of the footprint.

3. A communication gateway as claimed in claim 2, characterized in that a battery compartment is provided at a backside of the cover and that the battery compartment has a lid, which is detachably attached to the rim of an opening in a front side of the cover and whereby the battery compartment has a partition wall which is attached to the backside of the cover, whereby the partition wall has in-moulded battery connectors at one side and solder pads for leads adapted to form connections between the battery connectors and power consuming parts within the moisture tight enclosure.

4. A communication gateway as claimed in claim 3, characterized in that the square base element and the cover are secured against each other by a connection screw at each corner, which screws are tube-shaped and each has a through-going hole along the centre axis thereof, and that mounting screws for mounting the square base element onto a mounting base at each corner of the base element are provided co-axially with the tube connection screws and may be reached through the holes in the connection screws.

5. A communication gateway as claimed in claim 4, characterized in that the square base element and the cover each comprise a skin, which is attached to the base element and the cover respectively in an assembly process, whereby one or more narrow tether strips of the skin interconnects the base skin and cover skin at one particular exterior side such that the square base element and the cover shall remain tethered to each other when the cover is loosened from the base element by un-tightening the connection screws.

6. The communication gateway as claimed in claim 2, the footprint being no more than 8500 mm2.

7. A communication gateway according to claim 1, characterized in that the built-in sensor is adapted to determine battery voltage.

* * * * *